United States Patent

[11] 3,619,500

[72] Inventors Richard F. Bouley
Hermosa Beach;
Jay M. Hansen, Santa Monica; Robert
Zwirn, Los Angeles, all of Calif.
[21] Appl. No. 831,273
[22] Filed June 4, 1969
[45] Patented Nov. 9, 1971
[73] Assignee Hughes Aircraft Company
Culver City, Calif.

[54] ELECTRONIC IMAGE MOTION STABILIZATION SYSTEM
8 Claims, 8 Drawing Figs.

[52] U.S. Cl. .......... 178/7.8
[51] Int. Cl. .......... H01j 29/02, H01j 29/86
[50] Field of Search .......... 178/7.8-7.92; 250/203, 234; 343/6; 315/27 XY; 313/84

[56] References Cited
UNITED STATES PATENTS

| | | | |
|---|---|---|---|
| 2,967,211 | 1/1961 | Blackstone et al. | 178/7.82 |
| 3,389,221 | 4/1964 | MacDonald | 178/7.92 |
| 3,430,169 | 2/1969 | Gabor | 335/213 |
| 3,435,140 | 3/1969 | Hueber et al. | 178/7.81 |
| 3,518,372 | 6/1970 | Johns | 178/7.81 |

*Primary Examiner*—Rodney D. Bennett, Jr.
*Assistant Examiner*—N. Moskowitz
*Attorneys*—James K. Haskell and Robert H. Himes

ABSTRACT: The apparatus of the present invention provides image motion stabilization of a displayed scene generated by a lens system on a transportable body for apparent line-of-sight motions that occur from coupled vehicle body motions and also to provide accurate pointing commands with respect to the displayed line-of-sight. In implementing the system, a single set of gyros is used as a sensor to provide a feed forward image motion correction signal, as well as a sensor motion feedback signal. This feedback signal is summed with a rate command to form an error voltage which causes the sensor to the slewed to the desired position at the commanded rate. The addition of this feedback loop with the image motion compensation error sensor provides a substantial reduction of the image motion correction angle and concomitant pointing error during slewing that is limited only by the servo bandwidth. In addition to the foregoing, implementation also requires the use of an improved deflection coil and apparatus for properly scaling driver signals thereto to accommodate changes in field-of-view and light levels within the image intensifier portion of the sensor.

INVENTORS.
RICHARD F. BOULEY,
JAY M. HANSEN,
ROBERT ZWIRN,
BY Robert W. Hines
ATTORNEY.

ELECTRONIC IMAGE MOTION STABILIZATION SYSTEM

BACKGROUND OF THE INVENTION

Prior systems employing magnetic electron beam deflection within the image intensifier portion of the sensor for displayed scene stabilization were limited in the amount of low-frequency stabilization which could be provided without impairing the system slewing capability. Such systems providing image motion stabilization to remove angular perturbations at frequencies of 1 cycle/sec. or more, which are distracting for the viewer, were not capable of rapid slewing without loss of stabilization, vignetting or establishment of large angular differences between the sensor position and the displayed line-of-sight. For a weapon-mounted sensor in such a system, the pointing error during tracking for rates greater than one degree per second cannot be tolerated. Reduction of this angle by limiting, on the other hand, only results in loss of stabilization during slewing. Consequently, prior art systems employing image motion stabilization through image tube electron beam deflection are adequate for providing low-frequency scene stabilization but have accompanying severely limited slewing capabilities.

SUMMARY OF THE INVENTION

In accordance with the present invention, a deflection coil having a single core, accurate quadrature, minimum length with resulting minimum tube element interference and with no coupling or core shunting is employed in conjunction with an 80/25 intensifier tube. In addition, a stabilization system is employed wherein a gyro is not only used as a sensor to provide a feed forward image motion correction signal but is also used to provide a sensor motion feedback signal. This feedback signal is summed with a rate command to form an error voltage which causes the sensor to be slewed to the desired position at the command rate. The output from this stabilization system is a voltage proportional to the instantaneous, uncompensated, line-of-sight error which is independent of field-of-view or light control voltage. Deflection of the beam in the image intensifier tube for a given annular displacement is much larger for a narrow field-of-view than for a wide field-of-view. Apparatus responsive to the output from the stabilization system is accordingly provided to properly scale the uncompensated error signal for discrete changes in field-of-view and light control voltage and apply it to the deflection coil on the image intensifier tube.

DESCRIPTION

Figure 1:
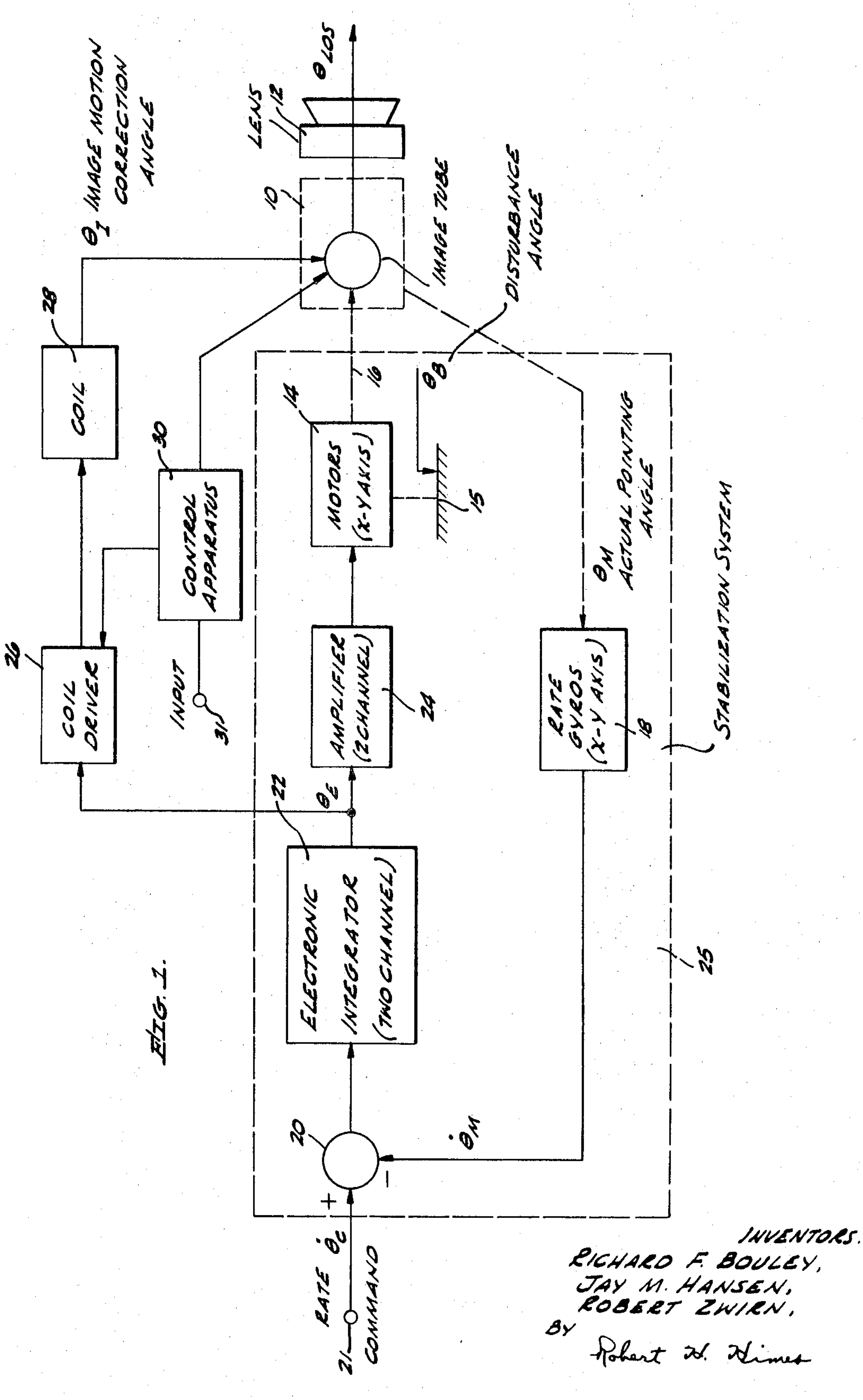
FIG. 1 shows a block diagram of the major subcomponents of the disclosed image motion compensation system.

Referring to FIG. 1 of the drawings, there is shown a functional block diagram for the image motion compensation system of the present invention. In particular, the image motion compensation system includes an image intensifier tube 10 which receives an image through a lens system 12 along a line-of-sight, $\theta_{LOS}$. Motors 14 are referenced to a body 15, on which the apparatus of the invention is mounted, and are mechanically coupled over a linkage 16 to the image tube 10 and/or lens system 12 for changing the direction of the line-of-sight, $\theta_{LOS}$, along $x$ and $y$ orthogonal axes of compensation. Changes in position of the body 15 result in a disturbance angle, $\theta_B$, input to the system.

$X$ and $y$ axes rate gyros 18 are mechanically referenced to the actual direction; i.e., the actual pointing angle, $\theta_M$, of the image tube 10 and lens system 12. The rate gyros 18 develop orthogonal components of a rate signal, $\underline{\dot{\theta}_M}$, that is proportional to the rate of change of the actual pointing angle, $\theta_M$. The rate signal, $\underline{\dot{\theta}_M}$, is applied to a summing device 20 along with a rate command input signal, $\underline{\dot{\theta}_C}$, available from an input terminal 21. The output from summing device 20, representative of $\underline{\dot{\theta}_C - \dot{\theta}_M}$, is applied to two-channel electronic integrator 22 to develop an error voltage, $\theta_E$, which, in turn, is applied to two-channel amplifier 24 to drive the motors 14.

Simultaneously, the error voltage, $\theta_E$, is applied to a deflection yoke coil driver 26 which drives a deflection yoke coil 28. The error voltage, $\theta_E$, available from the electronic integrator 22 constitutes a voltage proportional to the instantaneous, uncompensated, line-of-sight error and is independent of the field-of-view and light control voltage applied to image intensifier tube 10. The deflection of the electron beam in image intensifier tube 10 required for a given angular displacement is much larger for a narrow field-of-view than for a wide field-of-view. The gain must be scaled by the ratio of the magnifications. Since this "zoom" takes place in discrete steps, discrete gain changes are used in coil driver 26 to provide compensation. These gain changes are selected by a control apparatus 30 which selects the zoom setting of image intensifier tube 10 by either manual or automatic means through an input 31 thereto. In addition, in order to maintain the light output from image tube 10 at some optimum value, light gain is increased at low-light level. This results in increasing the velocity of the electron beam in image tube 10. The higher velocity electrons, however, spend less time passing through the magnetic field generated by deflection yoke coil 28 whereby the electron dynamics require a different magnetic field intensity to achieve the same deflection. This light level control is designed to change in discrete steps to enable compensation to be accomplished by gain changes in the coil drive 26. As before, these gain changes are selected automatically by coil driver 26 in response to a selection of light levels by control apparatus 30, as will be explained hereinafter in connection with FIG. 7.

Figure 2:
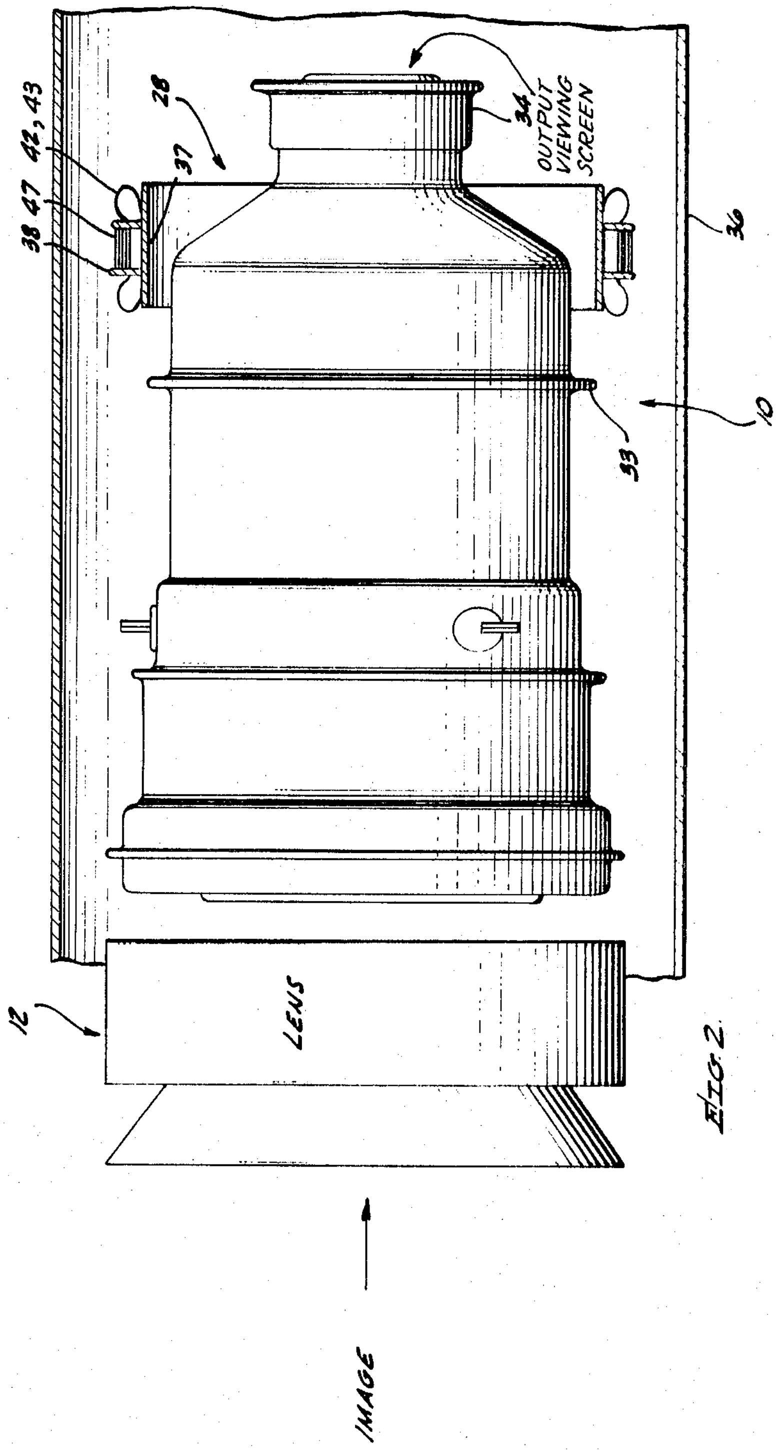
FIG. 2 shows a partial cross-sectional view of the image intensifier tube and image compensation coil in the apparatus of FIG. 1.

Referring to FIG. 2, there is shown a partial cross-sectional view of image intensifier tube 10, lens system 12 and deflection yoke coil 28. Image intensifier tube 10 may be of a type designated 80/25 which has kovar rings and electrodes 33, 34 which have a magnetic permeability greater than unity. In addition, in order to isolate the image intensifier tube 10 from stray magnetic fields, a magnetic shield 36 is disposed coaxially thereabout for the entire length thereof. In the operation of the present invention, it is essential that the deflection coil 28 not interfere with the elements of tube 10, have accurate quadrature magnetic fields and independent $x$ and $y$ deflections. To achieve these features, coil 28 must have minimum length so as to maintain maximum spacing from electrodes 33, 34, have no coupling between deflection coils and have no shunting of the magnetic field in the core by the magnetic shield 36.

Figures 3, 4, 5:
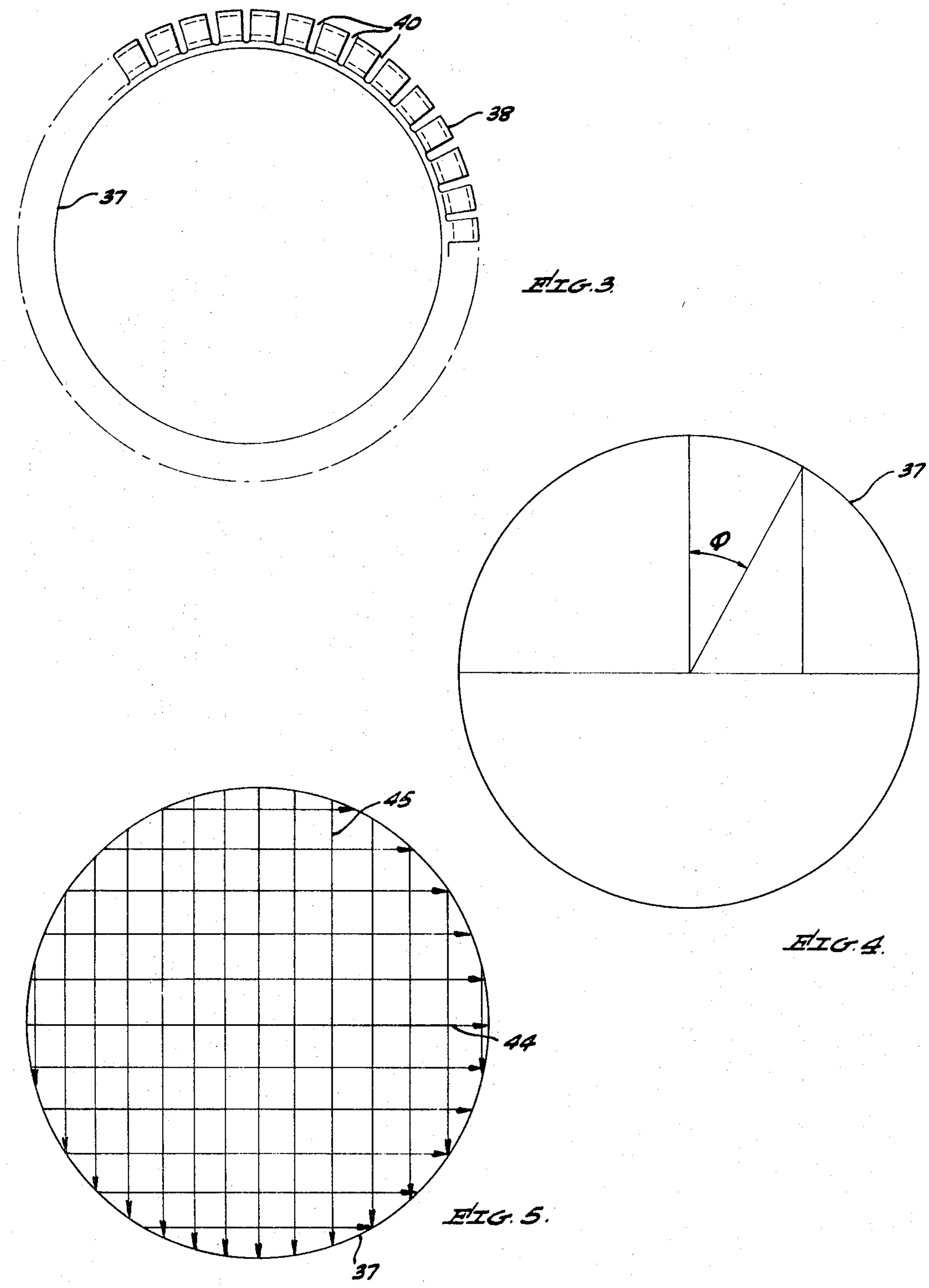
FIG. 3 shows a side view of the image compensation coil form in the apparatus of FIG. 2.
FIG. 4 is a diagram illustrating the winding density on the coil form of FIG. 3.
FIG. 5 illustrates the configuration of the orthogonal magnetic fields generated by the image compensation coil in the apparatus of FIG. 2.

Coil 28, accordingly, includes a dielectric form 37 of the order of 1 inch in length with a "U" shaped channel 38 disposed in the center portion thereof about the outer surface. Referring to FIG. 3, there is shown a side view of coil form 37. U-shaped channel 38 is provided with equally spaced radial notches 40 to portion it into 36 equal segments. Windings 42, 43, FIG. 2, are disposed in the notches 40 with the number of turns of each winding 42 and 43 being proportional to cosine of $\Phi$, FIG. 4. A cosine turn density may be achieved by commencing with two turns about adjacent notches 40 and expanding after each series of turns to adjacent notches 40 in both directions with 7, 11, 15, 19, 21, 24, 25 and 26 turns. Winding 42 includes first and second sets of turns disposed on opposite halves of the form 37. Similarly, winding 43 includes third and fourth sets of turns disposed in quadrature with the first and second sets. The first and second sets of the windings 42 are connected in series in a manner to generate a magnetic field 44, FIG. 5, in a common direction across the form 37. Similarly, third and fourth sets of winding 43 are connected in series in a manner to generate a magnetic field 45 across the form 37 that is orthogonal to the magnetic field 44. The cosine distribution of the windings 42, 43 generates substantially uniform orthogonal magnetic fields across the aperture of form 37. Lastly, a core 47, FIG. 2, is provided by a number of turns of 1 mil magnetic tape on top of the windings 42, 43. This tape may, for example, be square permalloy or supermalloy. Proper operation of coil 28 requires a field of approximately one oersted without saturation which can be achieved by 60–70 turns of magnetic tape.

Figure 6:
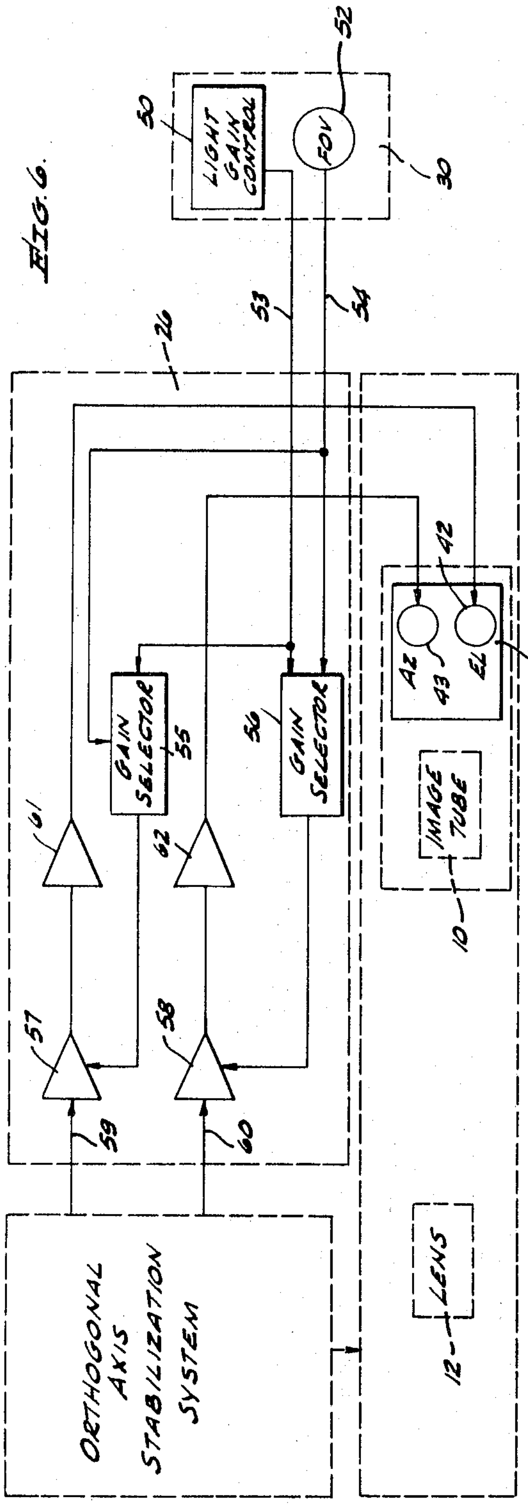
FIG. 6 shows the apparatus of FIG. 1 with a block diagram of the coil driver.

Referring now to FIG. 6, there is shown an orthogonal axis system of the apparatus of FIG. 1 with a schematic block diagram of the coil driver 26 and control apparatus 30. In particular, control apparatus 30 includes a light-gain-control apparatus 50 and a field-of-view control apparatus 52. Light-gain-control apparatus 50 offers three discrete light levels and develops an information level signal on one of three output leads 53 to indicate which level has been selected. Similarly, field-of-view control apparatus 52 develops an information level signal on one of four output leads 54 to indicate which zoom position has been selected. The output leads 53, 54 are applied to gain selectors 55, 56 of coil driver 26. Gain selectors 55, 56 control the gain of operational amplifiers 57, 58, respectively, which receive orthogonal components of the error signal, $\theta_E$, from the orthogonal axis stabilization system. FIG. 1, over leads 59, 60. The outputs of operational amplifiers are applied trough push-pull amplifiers 61, 62 respectively to coils 42, 43 of deflection yoke coil 28.

Figure 7:
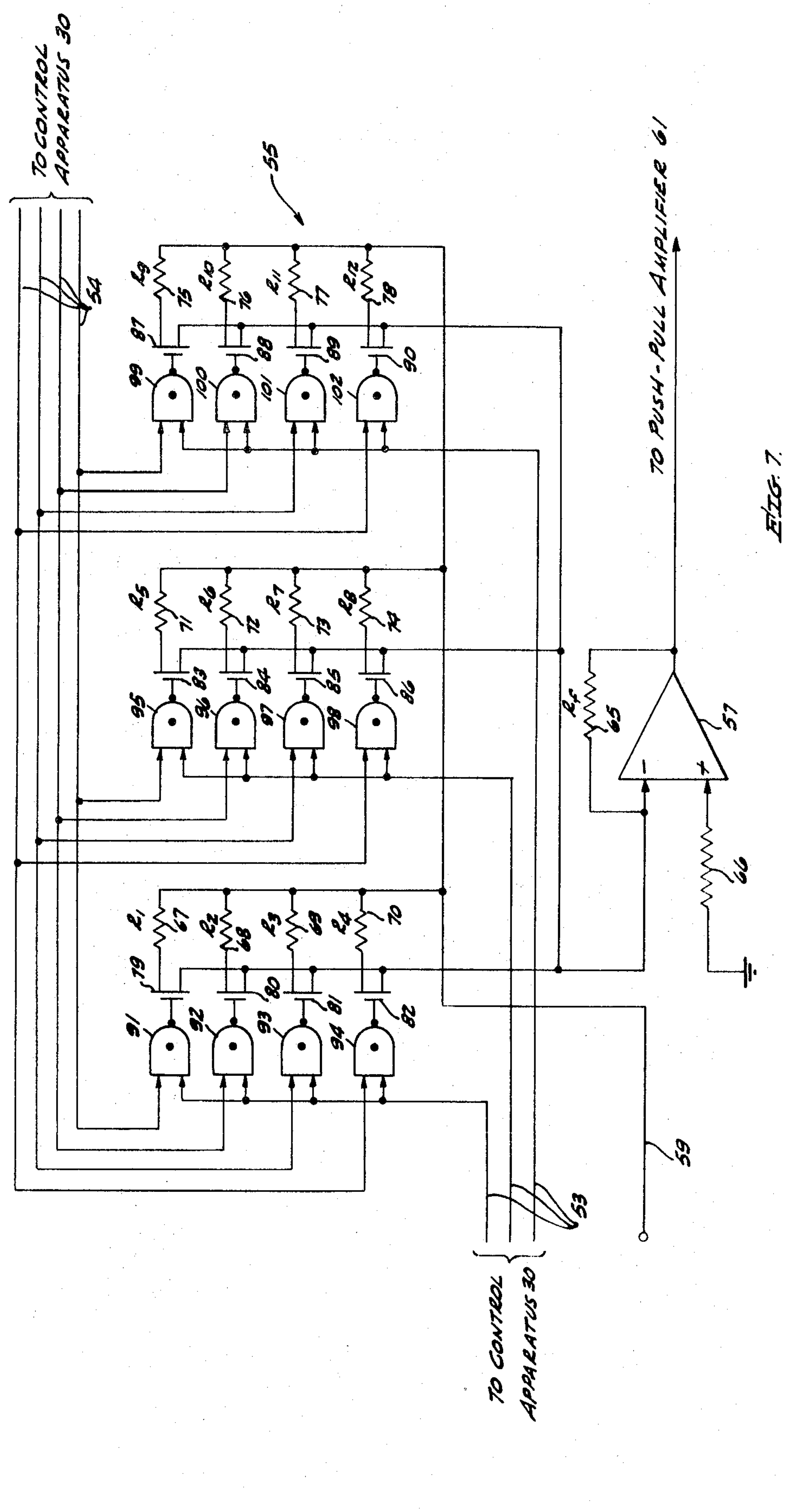
FIG. 7 illustrates a schematic block diagram of the gain select apparatus of FIG. 6.

The manner in which the gain selectors 55, 56 control the gain of operational amplifiers 57, 58 is illustrate in connection with gain selector 55 and operational amplifier 57 in FIG. 7. Referring to FIG. 7, a resistor 65 of ohmic value $R_f$ is connected from the output to the negative (−) input of operational amplifier 57 and the positive (+) input therefore is referenced to ground through a resistor 66. The lead 59 from the orthogonal axis stabilization system is connected to gain selector 55 where it connects through resistors 67–78 and respective switch elements 79–90 and returns to the negative (−) input of operational amplifier 57. Resistors 67–78 have ohmic value $R_1 \ldots R_n \ldots R_{12}$, respectively. Each of the switch elements 79–90 is operated respectively by a two-input AND gate 91–102 when both inputs thereto are at information level. The three leads 53 from light gain control 50 are connected to respective inputs of AND gates 91–94; 95–98; and 99–102. In addition, the four leads 54 from field-of-view control apparatus 52 of control apparatus 30 are connected, respectively, to respective inputs of AND gates 91, 95, 99; 92, 96, 100; 93, 97, 101; and 94, 98, 102. One of the leads 53 and one of the leads 54 is always at information level, whereby one of the AND gates 91–102 will generate a signal at the output thereof to cause the switch contact 79–90 associated therewith to close. The closing of one of the switch contacts 79–90 places the resistor 67–79 associate therewith in series with lead 59 and the negative (−) input of operational amplifier 57. The gain of the operational amplifier is equal to $-R_f/R_n$ where the ohmic value $R_n=R_1, R_2 \ldots$ or $R_{12}$ of the resistor 67–78 associated with the switch contact 79–90 that is closed. Thus, the ohmic values $R_1, R_2 \ldots R_{12}$ are selected to provide the appropriate gain for the combination of field-of-view and light level associate therewith. The gain selector 56 and operational amplifier 58 function in the same manner. The respective outputs of operational amplifiers 57, 58 are converted to double-ended outputs by push-pull amplifier 61, 62 and applied across *x–y* deflection coils 42, 43 of yoke 28.

In the operation of the apparatus of the present invention, the rate gyros 18 functions as a sensor to detect any angular movement of the actual pointing angle, $\theta_M$, as a result of the mechanical reference to the image intensifier tube 10 and the lens system 12. The image intensifier tube 10 and lens system 12 are referenced to the body 15 whereby a turning or vibrating of the body 15 constitutes disturbance angle, $\theta_B$, inputs to the system. In addition, slewing of the line-of-sight, $\theta_{LOS}$, produces a change in the actual pointing angle, $\theta_M$. The rate gyros 18 generate orthogonal components of the rate of change of the actual pointing angle, $\dot{\theta}_M$. The rate of change of actual pointing angle, $\dot{\theta}_M$, is summed with the rate command signal, $\dot{\theta}_C$, if and when existent, and the result $(\dot{\theta}_C-\dot{\theta}_M)$ integrate by the integrator 22 to produce orthogonal components of signal, $\theta$error signal, $\theta_E$. Low frequency or steady state components of error signal, $\theta_E$, are amplified by amplifier 24 and used to drive motors 14 to move the pointing angle $\theta_M$ in a direction to cancel or minimize the error signal, $\theta_E$. Rotation of the body 15 and slewing of the pointing angle, $\theta_M$, produce low-frequency or steady state components of this type. As the disturbance frequency increases, the capability of the motors 14 to move the lens system 12 is diminished whereby a resulting uncompensated error occurs. These uncompensated error signals are used to concurrently drive the deflection yoke 28 to shift the image in a direction to cancel out the vibration and thus avoid blurring the image. Steady-state pointing and low-frequency errors are also used to drive the deflection yoke 28. The motors 14, however, minimize the magnitude of these steady-state and low-frequency errors, thus enabling direct application of these error to the deflection yoke 28 with concomitant elimination of complex high-pass filtering thereby significantly improving the motion compensation response.

Figure 8:
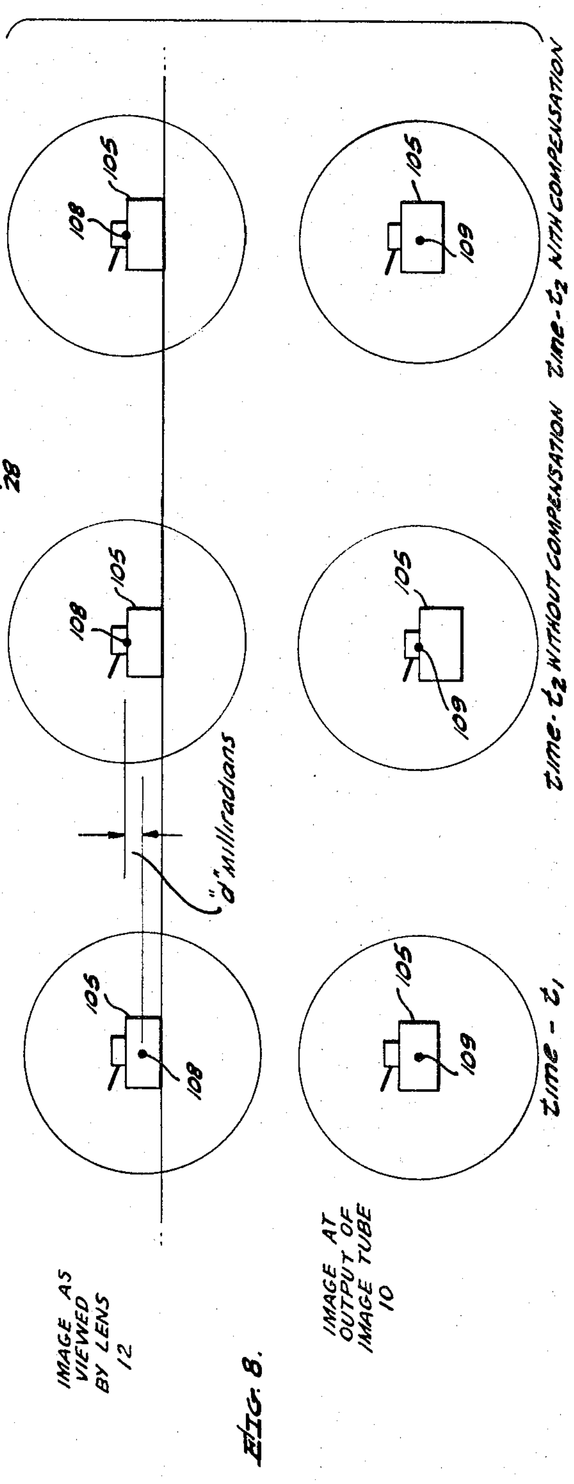
FIG. 8 is a pictorial representation of the operation of the image motion compensation system of the present invention.

The amount of current per radian applied to deflection yoke 28 is a function of the light level and field-of-view currently being selected and is automatically determined by gain selectors 55, 56, FIG. 6, in the manner previously explained. A feature of the stabilization system is that when slewing, the rate gyros 18 feed back the rate of change of pointing angle, $\dot{\theta}_M$, which is summed with the rate command signal, $\dot{\theta}_C$, to prevent the error signal, $\theta_E$, from becoming sufficiently large so as to drive the light-of-sight, $\theta_{LOS}$, off the viewing screen of the image intensifier tube 10. The foregoing operation is illustrated in connection with FIG. 8. Referring to FIG. 8, there is shown a target 105 as viewed by the lens 12 and portrayed at the output viewing screen of image tube 10 at a time, $t_1$ at a subsequent time, $t_2$, without image motion compensation and at a time, $t_2$, with image motion compensation. A dot 108 designates the center of the image including target 105 as viewed by lens 12 and a dot 109 at the center of the same image at the output viewing action of image tube 10. At time $t_1$ the lens 12 is directed directly towards the target 105 with the center dot 108 at the center thereof. At this time $t_1$, the same target 105 appears 27 at the output viewing screen of image tube 10 in the same relative position. At time $t_2$ the lens 12 moves rapidly upwards by a distance of "*d*" milliradians whereby the target 105 is lower relative to the dot 108. Without compensation, this same image appears at the output of image tube 10 in the same relative position, with the exception that it may appear blurred because of the rapid movement. With compensation, however, the shift in the pointing direction is detected by the rate gyros 18 and an error signal, $\theta_E$, generated and applied to deflection yoke 28 in a manner to shift the entire image including target 105 upwards at the output of image tube 10 simultaneous to its being deflected downwards so that at time $t_2$ target 105 appears in the same relative position with respect to dot 109 as at time $t_1$, thus preventing the image from blurring. A less rapid movement, however, allows the line of sight of lens 12 to shift and at the same time remain coincident with the center dot 109 of the output viewing screen of image tube 10.

What is claimed is:

1. An image motion compensation apparatus for a transportable viewing system, said apparatus comprising means including an image intensifier tube for intensifying an image from said viewing system; means mechanically coupled to said viewing system for producing a first signal representative of the angular rate of change of the actual pointing direction thereof; means including a summing device responsive to said first signal and to a rate command signal to change the pointing angle of said viewing system for producing a third signal representative of the difference therebetween; means coupled to said summing device for integrating said third signal thereby to produce a fourth signal representative of the error in pointing direction of said viewing system; means responsive to said fourth signal for changing said pointing angle of said viewing system in a direction to minimize steady-state and low-frequency components of said fourth signal; and means responsive to said fourth signal for concurrently changing the image deflection of said image intensifier tube in a direction to substantially cancel remaining component of said fourth signal.

2. The image motion compensation apparatus for a transportable viewing system as defined in claim 1 wherein said last-named means includes a coil disposed about the electron beam of said image intensifier tube, said coil having first and second orthogonal windings for generating orthogonal magnetic fields, each of said first and second windings being composed of turns disposed at equal intervals having a winding density proportional to the cosine of the angle of rotation about the center thereof.

3. The image motion compensation apparatus for a transportable viewing system as defined in claim 2 wherein said coil additionally include a short cylindrical form having a notched "U" shaped channel disposed about the outer outer periphery thereof for supporting said first and second windings, and numerous turns of a thin material having magnetic properties disposed about said form on top of said first and second windings within said "U" shaped channel thereby to provide a core for said coil.

4. The image motion compensation apparatus for a transportable viewing system as defined in claim 1 wherein said last-named means includes apparatus for selecting discrete light-level gain produced by said image intensifier tube and means coupled to said apparatus for selecting discrete light-level gains for maintaining the image deflection of said image intensifier tube resulting from said fourth signal independent of light-level gain.

5. The image motion compensation apparatus for a transportable viewing system as defined in claim 1 wherein said last-named means includes apparatus for selecting discrete fields-of-view by said image intensifier tube and means coupled to said apparatus for selecting discrete fields-of-view for maintaining the image deflection of said image intensifier tube resulting from said fourth signal proportional to the magnification thereof.

6. The image motion compensation apparatus for a transportable viewing system as defined in claim 1 wherein said last-named means includes apparatus for selecting discrete fields-of-view and light-level gains produced by said image intensifier tube and means coupled to said apparatus for selecting discrete fields-of-view and light-level gains for maintaining the proportionality between said image deflection of said image intensifier tube resulting from said fourth signal proportional to the magnification thereof.

7. An image motion compensation apparatus for a transportable viewing system, said apparatus comprising means including an image intensifier tube for intensifying an image from said viewing system; means mechanically coupled to said viewing system for producing a first signal representative of the angular rate of change of the actual pointing direction thereof, said first signal having orthogonal components in a predetermined coordinate system; means including a summing device responsive to said first signal and to a rate command signal having orthogonal components in said predetermined coordinate system to change the pointing angle of said viewing system for producing a third signal representative of the difference between the respective components of said first signal and said rate command signal in said predetermined coordinate system; means coupled to said summing device for integrating the components of said third signal thereby to produce orthogonal components in said predetermined coordinate system which form a fourth signal representative of the error in pointing direction of said viewing system; means responsive to said orthogonal components of said fourth signal for changing the pointing angle of said viewing system in a direction to minimize steady state and low-frequency components of said fourth signal; and means responsive to said orthogonal components of said fourth signal for concurrently deflecting the electron beam of said image intensifier tube in a direction to substantially cancel remaining components of said fourth signal, thereby to stabilize the image produced by said image intensifier tube.

8. An image motion compensation apparatus for a transportable viewing system, said apparatus comprising means including an image intensifier tube for intensifying an image from said viewing system; first and second rate gyros mechanically coupled to said viewing system for producing orthogonal components of a first signal in a predetermined coordinate system representative of the angular rate of change of the actual pointing direction thereof; a summing device responsive to said orthogonal components of said first signal and to orthogonal components in said predetermined coordinate system of a rate command signal to change the pointing angle of said viewing system for producing orthogonal components of a third signal representative of the difference therebetween; an electronic integrator coupled to said summing device and responsive to said third signal for generating orthogonal components of a fourth signal representative of the error in pointing direction of said viewing system; means responsive to said orthogonal components of said fourth signal for changing said pointing angle of said viewing system in a direction to minimize steady-state and low-frequency components of said fourth signal; and means responsive to said orthogonal components of said fourth signal for concurrently deflecting the electron beam of said image intensifier tube in a direction to substantially cancel said fourth signal.

* * * * *